(12) United States Patent
Talamoni

(10) Patent No.: US 7,658,862 B2
(45) Date of Patent: Feb. 9, 2010

(54) DUST SUPPRESSANT COMPOSITION

(75) Inventor: Joao R. Talamoni, Campinas (BR)

(73) Assignee: 3M Innovative Properties Company, St. Paul, MN (US)

( * ) Notice: Subject to any disclaimer, the term of this patent is extended or adjusted under 35 U.S.C. 154(b) by 169 days.

(21) Appl. No.: 11/778,266

(22) Filed: Jul. 16, 2007

(65) Prior Publication Data

US 2008/0017829 A1    Jan. 24, 2008

(30) Foreign Application Priority Data

Jul. 21, 2006    (BR) .................................... 0602881

(51) Int. Cl.
*C09K 3/22* (2006.01)

(52) U.S. Cl. ..................... 252/88.1; 252/88.2

(58) Field of Classification Search .................. None
See application file for complete search history.

(56) References Cited

U.S. PATENT DOCUMENTS

| | | | |
|---|---|---|---|
| 4,169,170 A | 9/1979 | Doeksen |
| 4,264,333 A | 4/1981 | Shaw et al. |
| 4,316,811 A | 2/1982 | Burns et al. |
| 4,369,121 A | 1/1983 | Callahan et al. |
| 4,417,992 A | 11/1983 | Bhattacharyya et al. |
| 4,428,984 A | 1/1984 | Shimizu et al. |
| 4,650,598 A | 3/1987 | Roberts et al. |
| 4,737,305 A | 4/1988 | Dohner |
| 4,801,635 A | 1/1989 | Zinkan et al. |
| 4,960,532 A | 10/1990 | Kremer |
| 5,194,174 A | 3/1993 | Roe et al. |
| 6,124,366 A | 9/2000 | Pullen et al. |
| 6,372,842 B1 | 4/2002 | Grisso et al. |
| 2004/0192789 A1 | 9/2004 | Smith et al. |
| 2005/0045853 A1 | 3/2005 | Colucci |
| 2005/0085407 A1 | 4/2005 | Oldenhove et al. |
| 2006/0008585 A1 * | 1/2006 | Woodhall et al. ........... 427/282 |

FOREIGN PATENT DOCUMENTS

WO    WO 91/00866    1/1991

* cited by examiner

*Primary Examiner*—Necholus Ogden, Jr.
(74) *Attorney, Agent, or Firm*—Dena M. Ehrich; Robert H. Jordan

(57) ABSTRACT

The present invention relates to a dust suppressant composition comprising a aqueous solution of polyvinyl alcohol, acrylic-based latex, glycerin, silicone based surfactant and a polysiloxane-based wetting agent. Preferably, the composition comprises from about 10 to about 46% of polyvinyl alcohol, from about 20 to about 60% of an acrylic-based latex, from about 0.6 to about 7.0% of glycerin, from about 0.1 to about 1.5% of silicone-based surfactant and from about 0.001 to about 0.5% of polysiloxane-based wetting agent. The composition provides a polymer film over a dusting material thus forming a homogeneous and resistant layer. The instant composition, which is applied over the dusting material (preferably sprayed over the material) and dried at room temperature, presents a low surface tension resulting in better wetting of the particulates and agglomeration of the material. The latter two properties ensure that there is less breakage of the polymer film during continuous use or application (e.g. during transportation of the dusting materials). Said surface tension is between about 20 and about 27 dynes/cm, and preferably of about 25 dynes/cm.

14 Claims, No Drawings

DUST SUPPRESSANT COMPOSITION

CROSS-REFERENCE TO RELATED APPLICATION

This application claims the benefit of Brazilian Application No. PI0602881-0, filed Jul. 21, 2006.

FIELD OF THE INVENTION

The instant invention relates to an aqueous composition for use as dust suppressant.

BACKGROUND OF THE INVENTION

The presence of particulate matter (i.e. dust) is a serious hazard with respect to the environment and in general, to the personal health and safety of individuals exposed to it. Examples of dust forming material include iron ores, coal and other friable (i.e. a material that is easily broken up into small pieces) materials. Said materials are heretofore referred to as dusting materials.

Dust can already be in existence or be produced as a result of mechanical operations such as mining, loading, transportation, storage and handling processes of dusting materials. Dust suppression, as used herein, is defined as the prevention or reduction of the amount of fine particulates airborne or suspended in the air.

There are chemical and mechanical methods for dust suppression. Mechanical methods include dust collection equipments such as filters and cyclones. They may capture entrained dust, induce dust to settle, ventilate the area where dust is formed, etc. Chemical methods include short and long term residual suppressants.

Long term residual dust suppressants control dust through the formation of a polymer or binder film over the dusting material. The film remains over said material after evaporation of the solvent (e.g. water). Water is included in long term residual suppressants in order to provide an even spreading of the composition on the dusting material and they usually include film-forming or tackifying resins.

One of the most common short term dust suppressants is water. One disadvantage of using this method lies on the fact that large quantities of water may be needed in order to fully wet the material. When used in coal, for example, it results in the decrease of its specific heating value. Another disadvantage is that water loses its effectiveness upon evaporation, thus it is not indicated for materials that are going to be transported for several days in opened carts. Additives such as surfactants and wetting agents may be used to improve properties of the composition. Examples of short term suppressants are described in Patent Application 20050085407, U.S. Pat. No. 6,124,366 and U.S. Pat. No. 5,409,626.

Foam suppressants form a layer over the dusting material and may be used to capture dust through its bubbles. As a result, the suppressant is only effective while the bubbles are present in the homogeneous layer.

Some currently available compositions are not immediately effective, therefore requiring an extended period of time for satisfactory performance. Other compositions include excessive aromatic or other materials such as high levels of organic solvents.

To avoid the many problems encountered in dust reduction and to provide better means for minimizing the amount of dust escaping to the environment, a large number of products and processes have been extensively described in the literature, ranging from the utilization of natural and synthetic polymers and also using mixtures and combinations of surfactants and organic solvents. For example, U.S. Pat. No. 6,372,842 relates to a method of using an aqueous composition or dispersion containing a water-soluble or water-dispersible synthetic polymer, made of acrylate esters and alkyl substituted acrylamide and modified with an organosilane, useful for dust control and other applications, like an agricultural spray composition.

Aqueous solutions are also described in U.S. Pat. No. 5,194,174 which relates to an improved non-viscous aqueous dust control solution which includes a polyvinyl alcohol and boric acid. Other examples include U.S. Pat. No. 4,417,992 and U.S. Pat. No. 4,801,635 and Patent Application WO 9100866.

Patent application US200440192789 provides a method for controlling dusting of material comprising the steps of: applying an effective amount of a composition comprising an alkylphenol ethoxylate surfactant, a polyglycol which can be glycerin, propylene glycol or a mixture thereof.

U.S. Pat. No. 4,264,333 describes a method wherein the coal is first coated with a wetting agent and then coated with an emulsion of crude coal tar in water containing a cationic emulsifying agent.

Wetting agents such as ethylene oxide may be used as described in U.S. Pat. No. 4,316,811 and U.S. Pat. No. 4,369,121

The use of ethoxylated alkyl phenols was described in U.S. Pat. No. 4,428,984, U.S. Pat. No. 4,737,305, U.S. Pat. No. 4,169,170.

The use of emulsions is described in U.S. Pat. No. 4,650,598 and U.S. Pat. No. 4,981,398.

Aromatic solvents may be used as described in U.S. Pat. No. 4,960,532 which relates to a dust suppressant composition comprising water and a thickening agent forming the dispersion medium and coal tar pitch and aromatic solvent forming the dispersed liquid. Said composition forms a resilient layer.

Patent Application US 20050045853 describes a method and composition for suppressing coal dust including a metal-containing compound mixed with any appropriate dust suppressant liquid.

SUMMARY OF THE INVENTION

The instant invention relates to an aqueous composition for use as dust suppressant. More particularly, the invention relates to an aqueous solution comprising polyvinyl alcohol, acrylic-based latex, glycerin, silicone based surfactant and a polysiloxane-based wetting agent.

The composition described herein provides a polymer film over the dusting material which due to cohesive forces forms a homogeneous and resistant layer. Another characteristic of the composition relates to its low surface tension resulting in a better wetting of the particulates and agglomeration of the material. As a result, less breakage of the formed film is observed.

The composition is applied over the dusting material, preferably through spray nozzles, and dried at room temperature.

The composition presents a surface tension of between about 20 and about 27 dynes/cm. Preferably the surface tension is of about 25 dynes/cm.

DESCRIPTION OF THE INVENTION

The use of the composition described herein prevents dust particles from accumulating in the surrounding environment and it is generally sprayed over the dusting material.

The invention relies on the cohesive force, agglomerating and film forming properties of the composition in order to ensure that a homogeneous layer is formed over the surface of the dusting material to protect it from wind and the like.

The composition comprises a mixture of at least one polyvinyl alcohol (commercialized by Celanese Chemicals, from USA, under the tradenames CELVOL 205 and CELVOL 203; also commercialized by DuPont, also from USA, under the tradename ELVANOL 71-30) and an acrylic-based latex. Said latex may be pure acrylic-based polymers (also commercialized by Rhom & Haas Company, from USA, under the tradename RHOPLEX GL618) or acrylates such as styrene-acrylates (such as commercialized by Denver Resinas, from Brazil, under the tradenames DENVERCRIL RA067, DENVERCRIL RA154, DENVERCRIL RA193 and DENVERCRIL RA194, also commercialized by Rhodia Brazil, under the tradename RHODOPAS SA129; also commercialized by BASF AG, from Germany, under the tradenames ACRONAL 230D and STYROFAN 417D; also commercialized by Industrias Químicas Taubate SA, IQT, from Brazil, under the tradename PEX 1702/005).

The main difference between different styrene-acrylate latexes relate to the content of styrene in each composition. Usually, the higher the styrene content, the cheaper the material, therefore one may chose a styrene-acrylate latex based on its cost and it should be noted that its use is not detrimental to the overall performance of the product.

The combination of two different film formers like polyvinyl alcohol (heretofore referred to as PVOH) and an acrylate material play an important role in the composition because on one side we have a material with an excellent film formation property (i.e. PVOH) and on the other side, we have a material that forms a stronger film with the property to increase the adhesion with time over most substrates (i.e. acrylic-based materials such as styrene-acrylates or pure acrylics).

Glycerin (commercialized by Industria Química Anastácio SA, from Brazil, under the tradename Glycerin; also commercialized by Brenntag Química Brasil LTDA, under the tradename Glycerin) is used as a plasticizer of the whole system and also as a secondary wetting agent.

The composition further includes a polysiloxane-based wetting agent such as commercialized by Byk Chemie, from Germany, under the tradename BYK 341 and a silicone based surfactant (commercialized by Dow Corning Corporation under the tradename Q2 5211; also commercialized by Akzo Nobel Surface, from Netherlands, under the tradename WITCOLATE EP).

Both the wetting agent and the surfactant play an important role in the composition because they are responsible for lowering the surface tension thus improving wetting properties. As a result, the composition penetrates through the particulates of the dusting material and an agglomeration is observed. Said agglomeration is responsible for avoiding the mechanical impact caused by the lose material which would create more dust. It was observed that the maximum efficiency of the composition described herein (the best agglomeration and penetration of the composition on the dusting material as explained above) was found when the surface tension of the composition was of or less than about 27 dynes/cm. Preferably the surface tension was of about 25 dynes/cm.

EXAMPLES

Usually, for dust controlling solutions, the most preferred application method is spraying a diluted solution of the material over the area or material you want to control/avoid dust emission, covering the area totally and forming not only a film, but also causing material agglomeration. Said material agglomeration is especially important to prevent breakage of the formed film due to excessive drying during demanding operations (e.g. transportation of dusting materials in opened carts). Commercially, dilution of compositions usually ranges from 1.0 to 3.0% of concentrated material in water due to cost restrictions. The compositions may work under 1.0% or over 3.0% however if in excess, they wouldn't be commercially viable.

Several solution concentrations were tested and it was found that the minimum polymer concentration to achieve an excellent dust suppression level is of about 1.0 grams/liter after dilution. Preferably, the minimum polymer concentration is of about 1.27 grams/liter after dilution.

The examples described below illustrate embodiments of the composition, however should not be used to reduce the scope of the invention.

Example 1

In a one-liter glass kettle, 190 grams of Deionized Water (heretofore referred to as DI water) were added. The kettle was sealed off and the agitation system was turned on. Through the manhole, 260 grams of PVOH were carefully added under strong agitation. After the addition was completed, the solution was heated to 90° C. The heating period was extremely long due to the high viscosity of the solution. At this temperature, the solution was kept under agitation for 90 minutes. This period is known as the cooking time for the PVOH and it was followed by the cooling of the solution to about 35° C. At this temperature, 66 grams of ethyl alcohol, 1.2 grams of methyl alcohol and 10.8 grams of isopropyl alcohol were sequentially added to the batch. The solution was kept under strong agitation for 15 minutes and followed by the addition of a pre-mixture of 32 grams of glycerin and 7.2 grams of water. After 15 more minutes of mixture under strong agitation, 0.32 grams of DISPERBYK 341 and 7.2 grams of surfactant Witcolate EP were sequentially added to the batch. The solution was kept under strong agitation for 15 minutes and then 6 grams of PROXEL GXL were added. The solution was kept under strong agitation for 1 hour and drained to a glass bottle. Appearance of the final composition: Clear amber viscous solution, free of foreign material

Example 2

Using the same procedure described on example 1, 330 grams of DI Water were added to kettle, followed by the addition of 260 grams of PVOH. The PVOH was cooked as described in example 1 and the solution was cooled down to about 35° C. At this temperature, 17.15 grams of ethyl alcohol, 0.31 grams of methyl alcohol and 2.81 grams of isopropyl alcohol were sequentially added to the batch. The solution was mixed for 15 minutes, followed by the addition of a pre-mixture of 8.32 grams of glycerin and 1.82 grams of DI water to the solution. After 15 more minutes of mixing, 0.08 grams of DISPERBYK 341, 1.71 grams of surfactant Witcolate EP and 1.71 grams of surfactant Q2 5211 diluted in a 1:1 water mixture were sequentially added. After 15 minutes of strong agitation, 1.56 grams of PROXEL GXL were added. The solution was kept under strong agitation for 1 hour and drained to a glass bottle.

Appearance of the final composition: Clear amber viscous solution, free of foreign material

Example 3

Using the same procedure described in example 1, 238 grams of DI Water were added to the kettle, followed by the addition of 79.21 grams of PVOH, giving a lower viscous solution. The PVOH was cooked as previously described, and then the solution temperature was decreased to 70° C. At this temperature, full vacuum was applied to the kettle and DI water was removed from the batch. After 2 hours, about 128 grams of water were collected resulting in a PVOH water solution with about 42% solids. After water removal the vacuum was broken using nitrogen and the batch temperature was cooled down to about 35° C. At this temperature, 15.66 grams of ethyl alcohol, 0.10 grams of methyl alcohol and 0.90 grams of isopropyl alcohol were sequentially added to the batch. After 15 minutes of strong agitation, a pre-mixture of 2.65 grams of glycerin and 0.60 grams of DI water were also added. After 15 more minutes of agitation, 0.025 grams of DISPERBYK 341, 0.60 grams of surfactant Q2 5211 diluted in a 1:1 water mixture, 0.012 grams of FLEXONYL Blue Dye A-A and 0.50 grams of PROXEL GXL were sequentially added to the solution. The solution was kept under strong agitation for 1 hour and drained to a glass bottle.

Appearance of the final composition: Clear blue viscous solution, free of foreign material Example 4

Using the same procedure described in example 1, 190 grams of DI Water were added to the kettle, followed by the addition of 114 grams of PVOH, giving a viscous solution. The PVOH was cooked as previously described, and the batch temperature was cooled down to about 35° C. At this temperature, 456 grams of RHOPLEX GL 618 were added to the batch, resulting in a viscous milky white solution. After 30 minutes of medium agitation, 22.1 grams of ethyl alcohol, 0.40 grams of methyl alcohol and 3.62 grams of isopropyl alcohol were sequentially added to the batch. Fifteen minutes later, a pre-mixture of 10.71 grams of glycerin and 2.41 grams of DI water were added and the solution was kept under agitation for 15 more minutes. After this period, 0.10 grams of DISPERBYK 341, 2.41 grams of surfactant Q2 5211 diluted in a 1:1 water mixture, 0.05 grams of FLEXONYL Blue Dye A-A and 2.01 grams of PROXEL GXL were sequentially added. The solution was kept under mild agitation for 1 hour and drained to a glass bottle.

Appearance of the final composition: Clear light blue low viscosity solution, free of foreign material.

Example 5

Using the same procedure described in example 1, 342 grams of DI Water were added to the kettle, followed by the addition of 114 grams of PVOH, giving a lower viscous solution. The PVOH was cooked as previously described, and then the solution temperature was decreased to 70° C. At this temperature, full vacuum was applied to the kettle and DI water was removed from the batch. After 2 hours, about 152 grams of water were collected, resulting in a PVOH water solution with about 37.5% solids. To measure the percent of solids in the solution, samples were regularly collected from the batch and put in an oven with circulated air at 120° C. for 30 minutes.

After water removal, the vacuum was broken using nitrogen and the batch temperature was cooled down to about 35° C. At this temperature, 456 grams of RHOPLEX GL 618 were added to the batch, resulting in a viscous milky white solution. After 30 minutes of medium agitation, 22.1 grams of ethyl alcohol, 0.40 grams of methyl alcohol and 3.62 grams of isopropyl alcohol were sequentially added to the batch. Fifteen minutes later, a pre-mixture of 10.71 grams of glycerin and 2.41 grams of DI water were added to the batch and the solution was kept under agitation for 15 more minutes. After this period, 0.10 grams of DISPERBYK 341, 2.41 grams of surfactant Q2 5211 diluted in a 1:1 water mixture, 0.05 grams of FLEXONYL Blue Dye A-A and 2.01 grams of PROXEL GXL were sequentially added. The solution was kept under mild agitation for 1 hour and drained to a glass bottle.

Appearance of the final composition: Clear light blue low viscosity solution, free of foreign material Example 6

Using the same procedure described in example 1, 294 grams of DI Water were added to the kettle, followed by the addition of 98 grams of PVOH, giving a lower viscous solution. The PVOH was cooked as previously described, and then the solution temperature was decreased to 70° C. At this temperature, full vacuum was applied to the kettle and DI water was removed from the batch. After 2 hours, about 131 grams of water were collected, resulting in a PVOH water solution with about 37.5% solids. The control of the percent of solids in the solution was carried out as described in example 5.

After water removal, the vacuum was broken using nitrogen and the batch temperature was cooled down to about 35° C. At this temperature, 393 grams of RHOPLEX GL 618 were added to the batch, resulting in a viscous milk white solution. After 30 minutes of medium agitation, 19.02 grams of ethyl alcohol, 0.35 grams of methyl alcohol and 3.11 grams of isopropyl alcohol were sequentially added to the batch. Fifteen minutes later, a pre-mixture of 9.22 grams of glycerin and 2.08 grams of DI water were added to the batch and the solution was kept under agitation for 15 more minutes. After this period, 0.09 grams of DISPERBYK 341, 4.15 grams of surfactant Q2 5211 diluted in a 1:1 water mixture, 0.04 grams of FLEXONYL Blue Dye A-A and 1.73 grams of PROXEL GXL were sequentially added. The solution was kept under mild agitation for 1 hour and drained to a glass bottle.

Appearance of the final composition: Clear light blue low viscosity solution, free of foreign material Example 7

The same material was produced as described in example 6, except for the fact that instead of the addition of RHOPLEX GL 618, 260 grams of DENVERCRIL RA067 were added to the batch. All other materials and conditions remained the same as described in example 6.

Appearance of the final composition: Clear light blue high viscosity solution, free of foreign material Example 8

The same material was produced as described in example 6, except for the fact that instead of the addition of RHOPLEX GL 618, 260 grams of DENVERCRIL RA154 were added. All other materials and conditions remained the same as described in example 6.

Appearance of the final composition: Clear light blue medium viscosity solution, free of foreign material Example 9

The same material was produced as described in example 6, except for the fact that instead of the addition of RHOPLEX GL 618, 260 grams of DENVERCRIL RA193 were added. All materials and conditions remained the same as described in example 6.

Appearance of the final composition: Clear light blue low viscosity solution, free of foreign material Example 10

The same material was produced as described in example 6, but instead of 140 grams RHOPLEX GL 618, 120 grams of STYROFAN 417D were added to the batch. All materials and conditions remained the same as described in example 6.

Appearance of the final composition: Clear light blue medium viscosity solution, free of foreign material Example 11

The same material was produced as described in example 6, except for the fact that instead of the addition of RHOPLEX GL 618, 260 grams of DENVERCRIL RA194 were added to the batch. All other materials and conditions remained the same as described in example 6.

Appearance of the final composition: Clear light blue low viscosity solution, free of foreign material Example 12

The same material was produced as described in the example 6, except for the fact that instead of the addition of RHOPLEX GL 618, 260 grams of PEX 1702/005 were added to the batch. All other materials and conditions remained the same as described in example 6.

Appearance of the final composition: Clear light blue low viscosity solution, free of foreign material Example 13

The same material was produced as described in the example 6, except for the fact that instead of the addition of RHOPLEX GL 618, 260 grams of RHODOPAS SA129 were added to the batch. All other materials and conditions remained the same as described in the previous example.

Appearance of the final composition: Clear light blue low viscosity solution, free of foreign material

TABLE 1

Results of the examples

| Examples | Brookfield Viscosity (cPs) | pH | Surface Tension (dynes/cm) | Solids (%) |
|---|---|---|---|---|
| 1 | 80,000 | 5.86 | 31.0 | 52.62 |
| 2 | 46,000 | 5.92 | 28.0 | 52.62 |
| 3 | 26,000 | 6.72 | 25.0 | 39.74 |
| 4 | 2,450 | 6.58 | 25.5 | 40.67 |
| 5 | 3,950 | 7.08 | 20.5 | 40.02 |
| 6 | 450 | 7.08 | 20.0 | 42.92 |
| 7 | 23,590 | 4.88 | 29.0 | 44.05 |
| 8 | 13,100 | 6.72 | 27.5 | 44.09 |
| 9 | 8,200 | 4.88 | 25.0 | 43.14 |
| 10 | 16,990 | 4.88 | 27.5 | 43.25 |
| 11 | 5,980 | 7.24 | 24.5 | 43.14 |
| 12 | 1,700 | 7.08 | 22.5 | 49.14 |
| 13 | 5,310 | 7.14 | 23.0 | 43.45 |

The viscosity of the compositions was measured in a LVT Brookfield Viscometer. Samples of the compositions were left in a water bath set for 25° C. for 2 hours prior to the test. Spindle 4 was used and the speed varied accordingly to the range of the viscosity as shown below:

Viscosity<1,000 cPs: 30 rpm 1,000 cPs<Viscosity<25,000 cPs: 12 rpm

Viscosity>25,000 cPs: 6 rpm

The pH was measured in a pHmeter previously calibrated with buffer solutions of pH 4.0 and 7.0.

To measure the percent of solids in the solution, samples were regularly collected from the batch and put in an oven with circulated air at 120° C. for 30 minutes. The samples were then allowed to cool down in a dessicator prior to weighing.

Further information about the composition is shown in table 2.

TABLE 2

Raw materials

| Raw Materials | Amount (%) | Preferred Composition (%) |
|---|---|---|
| Water | 20-75 | 35-50 |
| PVOH | 10-46 | 12-20 |
| Acrylic-based latex | 20-60 | 25-50 |
| Ethyl alcohol | 2-15 | 2.5-5.0 |
| Methyl alcohol | 0.01-0.5 | 0.01-0.1 |
| Isopropyl alcohol | 0.25-2.0 | 0.25-0.75 |
| Glycerin | 0.6-7.0 | 1.0-3.0 |
| Polysiloxane | 0.001-0.5 | 0.01-0.2 |
| Silicone | 0.1-1.5 | 0.5-1.0 |
| Dye | Minimum 0.01 | |
| Biocide | Minimum 0.15 | |

The invention claimed is:

1. A dust suppressant composition comprising an aqueous solution comprising:
   i. from about 10 to about 46% of polyvinyl alcohol;
   ii. from about 20 to about 60% of an acrylic-based latex;
   iii. from about 0.6 to about 7.0% of glycerin;
   iv. from about 0.1 to about 1.5% of silicone-based surfactant; and
   v. from about 0.001 to about 0.5% of polysiloxane-based wetting agent.

2. A dust suppressant composition comprising an aqueous solution comprising:—
   i. from about 12 to about 20% of polyvinyl alcohol;
   ii. from about 25 to about 50% of an acrylic-based latex;
   vi. from about 1.0 to about 3.0% of glycerin;
   vii. from about 0.5 to about 1.0% of silicone-based surfactant; and
   viii. from about 0.01 to about 0.2% of polysiloxane-based wetting agent.

3. A dust suppressant composition according to claim 1 wherein the dilution is from 1.0 to 3.0% of concentrated material in water.

4. A dust suppressant composition according to claim 3, wherein the minimum polymer concentration is 1.0 grams/liter after dilution.

5. A dust suppressant composition according to claim 4, wherein the minimum polymer concentration is 1.27 grams/liter after dilution.

6. A dust suppressant composition according to claim 1, which provides a polymer film over the dusting material.

7. A dust suppressant composition according to claim 6, wherein the polymer film forms a homogeneous and resistant layer over the surface of the dusting material.

8. A dust suppressant composition according to claim 1, further comprising a surface tension is of about 25 dynes/cm.

9. A dust suppressant composition according to claim 2 the dilution is from 1.0 to 3.0% of concentrated material in water.

10. A dust suppressant composition according to claim 9, wherein the minimum polymer concentration is 1.0 grams/liter after dilution.

11. A dust suppressant composition according to claim 10, wherein the minimum polymer concentration is 1.27 grams/liter after dilution.

12. A dust suppressant composition according to claim 2, which provides a polymer film over the dusting material.

13. A dust suppressant composition according to claim 12, wherein the polymer film forms a homogeneous and resistant layer over the surface of the dusting material.

14. A dust suppressant composition according to claim 2, further comprising a surface tension is about 25 dynes/cm.

\* \* \* \* \*

UNITED STATES PATENT AND TRADEMARK OFFICE
CERTIFICATE OF CORRECTION

PATENT NO. : 7,658,862 B2
APPLICATION NO. : 11/778266
DATED : February 9, 2010
INVENTOR(S) : Joao Roberto Talamoni It is certified that error appears in the above-identified patent and that said Letters Patent is hereby corrected as shown below:

On the Title page Item (30) (Foreign Application Priority Data)
Line 1, delete "0602881" and insert in place thereof -- PI0602881-0 --.

On the Title page, Item (57) (Abstract)
Line 2, before "aqueous" delete "a" and insert in place thereof -- an --.
Line 19, after "about 20" delete "and" and insert in place thereof -- to --.

Column 2
Line 26, after "121" insert -- an --.

Column 4
Line 40, after "material" insert -- . --.
Line 61, after "material" insert -- . --.

Column 5
Line 21 ( approx.), after "material" insert -- . --.

Column 6
Line 10 (approx.), after "material" insert -- . --.
Line 41, after "material" insert -- . --.
Line 52 (approx.), after "material" insert -- . --
Line 62 (approx.), after "material" insert -- . --.

Column 7
Line 6, after "material" insert -- . --.
Line 15, after "material" insert -- . --.
Line 26 (approx.), after "material" insert -- . --.
Line 36, after "material" insert -- . --.
Line 46, after "material" insert -- . --.

Signed and Sealed this

Seventh Day of December, 2010

David J. Kappos
*Director of the United States Patent and Trademark Office*

CERTIFICATE OF CORRECTION (continued)
U.S. Pat. No. 7,658,862 B2

Column 8
Line 9 (approx.), delete "pHmetcr" and insert in place thereof -- pH meter --.
Line 45 (approx.), in Claim 2, after "comprising:" delete "—".
Line 49, in Claim 2, delete "vi." and insert in place thereof -- iii. --.
Line 50, in Claim 2, delete "vii." and insert in place thereof -- iv. --.
Line 52, in Claim 2, delete "viii." and insert in place thereof -- v. --.
Line 54, in Claim 3, after "claim 1" insert -- , --.

Column 9
Line 3, in Claim 9, after "claim 2" insert -- , --.